United States Patent
Joao et al.

(10) Patent No.: US 11,263,137 B2
(45) Date of Patent: Mar. 1, 2022

(54) CORE-TO-CORE CACHE STASHING AND TARGET DISCOVERY

(71) Applicant: Arm Limited, Cambridge (GB)

(72) Inventors: Jose Alberto Joao, Austin, TX (US); Tiago Rogerio Muck, Austin, TX (US); Joshua Randall, Austin, TX (US); Alejandro Rico Carro, Austin, TX (US); Bruce James Mathewson, Papworth Everard (GB)

(73) Assignee: Arm Limited, Cambridge (GB)

( * ) Notice: Subject to any disclaimer, the term of this patent is extended or adjusted under 35 U.S.C. 154(b) by 39 days.

(21) Appl. No.: 16/884,359

(22) Filed: May 27, 2020

(65) Prior Publication Data
US 2021/0374059 A1    Dec. 2, 2021

(51) Int. Cl.
G06F 12/00    (2006.01)
G06F 12/0842    (2016.01)
G06F 12/0875    (2016.01)

(52) U.S. Cl.
CPC ...... G06F 12/0842 (2013.01); G06F 12/0875 (2013.01); G06F 2212/452 (2013.01)

(58) Field of Classification Search
CPC ...... G06F 3/0631; G06F 16/1734; G06F 1/30; G06F 3/0619; G06F 3/0689
See application file for complete search history.

(56) References Cited

U.S. PATENT DOCUMENTS

| | | | |
|---|---|---|---|
| 8,244,764 B2* | 8/2012 | Nichols | G06F 16/185 707/791 |
| 10,949,292 B1* | 3/2021 | Mathewson | G06F 11/1056 |
| 2010/0287137 A1* | 11/2010 | Lyakhovitskiy | G06F 16/10 707/609 |
| 2016/0110203 A1* | 4/2016 | Lai | G06F 9/542 712/220 |
| 2017/0010966 A1* | 1/2017 | Mittal | G06F 12/0842 |
| 2019/0129857 A1* | 5/2019 | Shamis | G06F 12/0824 |
| 2019/0129871 A1* | 5/2019 | Carro | G06F 12/0888 |

FOREIGN PATENT DOCUMENTS

CN    110865968 A    3/2020

* cited by examiner

*Primary Examiner* — Shawn X Gu
*Assistant Examiner* — Mohammad S Hasan
(74) *Attorney, Agent, or Firm* — Leveque Intellectual Property Law, P.C.

(57) ABSTRACT

A method and apparatus is disclosed for transferring data from a first processor core to a second processor core. The first processor core executes a stash instruction having a first operand associated with a data address of the data. A second processor core is determined to be a stash target for a stash message, based on the data address or a second operand. A stash message is sent to the second processor core, notifying the second processor core of the written data. Responsive to receiving the stash message, the second processor core can opt to store the data in its cache. The data may be included in the stash message or retrieved in response to a read request by the second processing core. The second processor core may be determined by prediction based, at least in part, on monitored data transactions.

22 Claims, 9 Drawing Sheets

| DATA ADDRESS | STASH TARGET ID(S) |
|---|---|
| A | 1 |
| A+1 | 1 |
| A+2 | 1 |
| A+3 | 1 |
| B | 2, 4 |
| C | 3 |
| C+1 | 3 |

| BASE DATA ADDRESS | SIZE | STASH TARGET ID(S) |
|---|---|---|
| A | 4 | 00000001 |
| B | 1 | 00001010 |
| C | 2 | 00000100 |

CORE-TO-CORE CACHE STASHING AND TARGET DISCOVERY

BACKGROUND

In a multi-core data processing system, data produced by a processing thread executing on a first processor core may be consumed by a processing thread executing on a second processor core. In operation, the producer core writes data to a local cache or a shared memory. A next read operation for the newly written data, by the second processor core, results in a cache miss since the data has not been loaded in the local cache of the second processor. Movement of the data into the local cache of the consuming core causes processing delay or latency.

BRIEF DESCRIPTION OF THE DRAWINGS

The accompanying drawings provide visual representations which will be used to more fully describe various representative embodiments and can be used by those skilled in the art to better understand the representative embodiments disclosed and their advantages. In these drawings, like reference numerals identify corresponding or analogous elements.

FIG. 5 shows an example of a Stash Target Table (STT), in accordance with various representative embodiments.

FIG. 6 shows a further example of a Stash Target Table (STT), in accordance with various representative embodiments.

DETAILED DESCRIPTION

Figure 1:
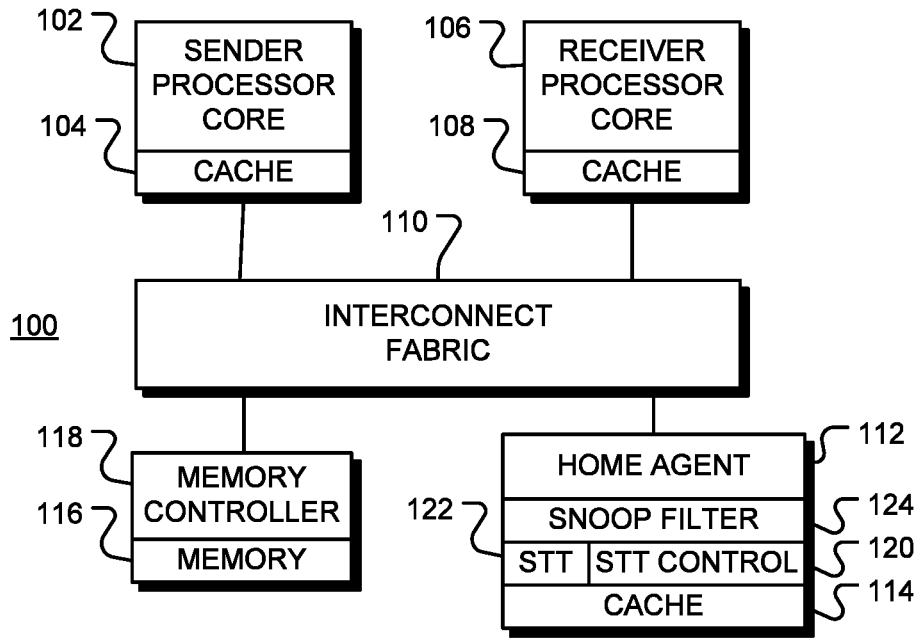
FIG. 1 is a simplified block diagram of a multi-core data processing system, in accordance with various representative embodiments.

The various apparatus, devices and methods described herein provide mechanisms for core-to-core cache stashing in a multi-core data processing system.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar, or corresponding parts in the several views of the drawings. For simplicity and clarity of illustration, reference numerals may be repeated among the figures to indicate corresponding or analogous elements.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements includes at least those elements listed and may also include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "configured to", when applied to an element, indicates that the element may be designed or constructed to perform a designated function, or has the required structure to enable it to be reconfigured or adapted to perform that function.

FIG. 1 is a simplified block diagram of a multi-core data processing system 100, in accordance with various representative embodiments. A first processor core 102, also referred to as the sender core or producer core, includes at least one local cache 104 (which may be private to the core or to a cluster of cores, for example) and a second processor core 106 includes at least one local cache 108. The second processor core 106 is also referred to as the receiver core or consumer core. In general, data processing system 100 may include any number of processor cores, some of which may be arranged in clusters and share lower level caches. The processor cores are coupled by interconnect fabric 110 that is configured to pass messages between the processor cores and other devices coupled to the interconnect fabric. Also coupled to interconnect fabric 110 is a home agent 112. Optionally, home agent 112 may include a system level cache 114. A shared memory 116 is coupled to interconnect fabric 110 via memory controller 118. The processor cores access shared memory 116 by sending request messages to home agent 112. The home agent manages a set or range of memory addresses and acts as a point of coherency and serialization for data, ensuring that copies of data stored in the caches are consistent and up-to-date. It will be apparent to those of ordinary skill in the art that any number of other components, such I/O devices, network interfaces, additional memories, processing accelerators, etc., may be included in the data processing system. The system may be integrated in a single integrated module, a multi-chip module, or may comprise distributed components.

Embodiments of this disclosure relate to transferring data, written or produced by the sender processor core 102, to cache 108 of the second processor core 106 before it is read by the second processor core. When the second processor core executes an instruction to read data, the access time is greatly reduced if the data is already stored in cache 108. Thus, the disclosed mechanisms provide improvements to the operation of the data processing system. The data may comprise the information in one cache-line (64 bytes, for example) and may be identified by the upper bits of a data address or some other identifier. Herein, the term 'data address' means an address of a data element (word or byte for example) an identifier of block of data containing that address (such as the upper-bits of an element address). When the data block is larger than the width of a data channel in the interconnect fabric, the data may be transferred in two or more flits (flow control digits) over the data channel.

Data may be associated with a data address. The data address may be, for example, a physical address in backing memory or store, or an address of an input/output device. A processor core may operate in a virtual address space that is mapped to a physical address space. A virtual address may be mapped to a physical address via one or more intermediate addresses. To speed processing, copies of data may be stored in one or more caches in the data processing system. Such data is said to be 'associated' with a data address. However, the data may be modified or written by a processor core and, at a given time, might not match data stored at the associated address.

Data produced by a processing thread executing on first processor core 102 may be consumed by a processing thread executing on second processor core 106. In a prior multi-core data processing system, the producer core writes data to a local cache 104, a home agent 114 or shared memory 116. A read operation for the newly written data, by the consuming core 106, will result in a cache miss. The data must then be moved into the local cache of the consuming core, causing processing delay or latency.

Core-to-core stashing, as disclosed herein, provides a mechanism for transferring data from a first processor core 102 to a local cache 108 of a second processor core 106 before it is read by the second processor core. This increases the probability of cache hit when the data is read.

Core-to-core stashing mitigates performance degradation caused by cache misses that are incurred, for example, by the consumer process in a producer-consumer communication pattern. In one embodiment, when producer core 102 completes writing to a cache line, it executes a stash instruction to initiate the transfer of the cache line to the private cache 108 of the consumer core. When the transfer is completed before the consumer core issues a request for the cache line, the consumer will hit in its private cache, significantly reducing the access latency for the cache line.

In some applications, the producer thread may know which core is running the consumer thread, and identify that core as the target of the stash operation. In one embodiment, the target core for a stash operation is specified by the producer processor core.

In other applications, it may be difficult or costly for the producer thread to determine the target core or to propagate that information through multiple layers of software. For example, it may be difficult to propagate information from a Message Passing Interface (MPI) library into a low-level communication library such as the Unified Communication X (UCX) library.

In a further embodiment, the target core is identified automatically based on prior data usage by the processor cores. In this embodiment, transactions from the processor cores that allocate and deallocate data into caches are monitored by Stash Target Table (STT) control circuitry 120 and may be used to update information in Stash Target Table 122. Stash Target Table 122 may be a memory, such as a set-associative cache. The cache may be indexed, and fully or partially tagged, with the physical or intermediate address of cache lines. The Stash Target Table stores a number of entries. Each entry stores identifiers of the stash target, or targets, for the address. Stash Target Table control circuitry 120 and Stash Target Table 122 may be implemented in the home agent or in one or more processor cores and are used to identify one or more processor cores as stash target cores for data associated with a designated data address.

Home agent 112 may also include snoop filter 124 that also monitors transactions from the processor cores that allocate and deallocate data into caches. STT 122 may be implemented by adding additional fields to entries in the cache of the snoop filter that identify predicted stash targets.

Thus, in accordance with an embodiment of the disclosure, the data processing system 100 includes interconnect fabric 110, a plurality of processor cores (102, 106) interconnected by the interconnect fabric. At least one processor core is configured for writing data associated with a first data address to a cache and executing a first stash instruction for the first data address. Stash Target Table control circuitry 120 is configured for monitoring transactions from the processor cores that allocate and deallocate data into caches of the processor cores and creating and updating entries in Stash Target Table 122. Stash Target Table control circuitry 120 is also configured for predicting, responsive to the first stash instruction, one or more processor cores to be stash target cores for data associated with a first data address and sending a stash message to the stash target cores, the stash message notifying the stash target cores of the data associated with the first data address and produced by the first processor core. A second processor core of the one or more stash target cores is configured to store the data associated with the first data address in a cache of the second processor core responsive to receiving the stash message.

As shown in FIG. 1, an embodiment of the data processing system may also include a home agent 112, coupled to the processor cores by the interconnect fabric 110, the home agent providing a point of coherences and serialization for the data processing system. In this embodiment, the home agent includes the Stash Target Table control circuitry 120. In an alternative embodiment, the Stash Target Table control circuitry 120 may be implemented in one or more of the processor cores.

A stash instruction executed by producer thread specifies a data address. The instruction may or may not also specify an identifier of an intended stash target core. When there is no explicit target in the instructions, the stash target may be determined in various ways. For example, a receiver core can register itself as stash target with a home agent or the home agent can predict the stash target. In some embodiments the prediction is based on the home agent monitoring Shared to Unique transitions for data addresses, Unique to Shared transitions and read operations for previously stashed data addresses.

A method of data transfer is disclosed in which a first processor core (the sending core) of a data processing system writes data associated with a first data address to a first cache. Writing may include, for example, generating data and associating it with the first data address in the cache or modifying data in cache associated with the first address. In either case, the first processor core may request ownership of data associated with the first address, causing copies of the data in other caches to be invalidated. The first data address may be, for example, a virtual address or a physical address.

Figure 2:
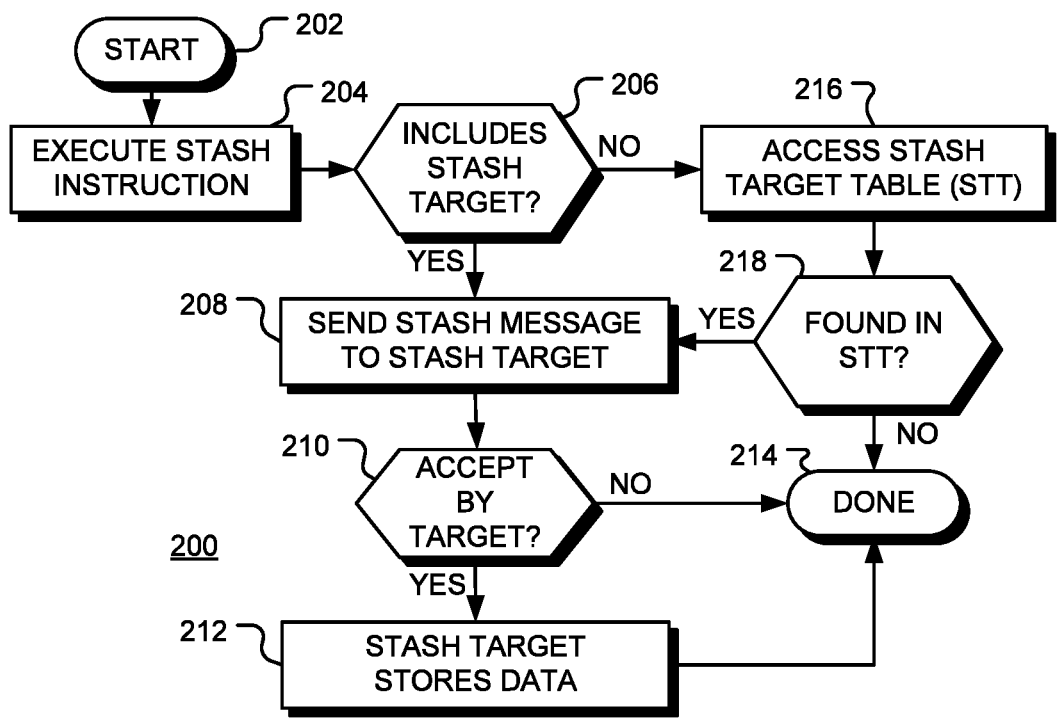
FIG. 2 is a flow chart of a method for data transfer in a multi-core data processing system, in accordance with various representative embodiments.

FIG. 2 is a flow chart 200 of a method for data transfer in a multi-core data processing system, in accordance with various representative embodiments. Following start block 202 in FIG. 2, the stashing operation begins with execution of a stash instruction at block 204 by a producer processor core. The stash instruction has one input register or operand specifying the data address to be stashed and, optionally, another input register or operand identifying a stash target or multiple stash targets. The cache line, in the cache of the first processor core, holding data associated with that address is the object of the operation. The stash instruction may be included in an Instruction Set Architecture (ISA) of the data processing system. Referring again to FIG. 2, when the stash instruction includes an identifier of a stash target, as depicted by the positive branch from decision block 206, a stash message is sent to the identified stash target (the receiver or consumer processor core) via the interconnect fabric at 208. The stash message identifies the data address and provides a notification or hint the stash target that data associated with the address is available. The stash message may be sent to the stash target directly or via the home agent. When sent via the home agent, the home agent generates a stash message and determines the target from the message from the target identifier. If the stash target opts to accept the data, as depicted by the positive branch from decision block 210, the stash target pre-fetches the data associated with the data address at block 212. Execution of the stash instruction is then complete, as indicated by block 214. Execution is also complete if the stash target determines not to accept the data, as depicted by the negative branch from decision block 210.

When the stash instruction does not include an identifier of a stash target, as depicted by the negative branch from decision block 206, the stash target is predicted from previous data transactions in the data processing system. A Stash Target Table (STT) is accessed at block 216, based on the data address, to identify one or more stash targets. In one embodiment, the STT is accessed by the producer processor core. In a further embodiment, the producing processor core sends a stash request to the home agent, via the interconnect fabric and the home agent accesses the STT. The stash request includes the first data address. As described above, the home agent acts as a point of coherency and serialization for a memory, or other addressable element of the data processing system, that is shared between processor cores. The home agent may include a snoop filter that records the presence and coherency state of data in various caches of the data processing system. Entries in the cache of the snoop filter are updated by monitoring transactions from the processor cores that allocate and deallocate data into their caches. The home agent may also include a system or last level cache. The home agent records which processor cores share copies of a cache line (this may be recorded as a presence vector, for example) and which, if any, of the sharers is designated as having ownership of the cache line.

If an entry is found in the Stash Target Table for the data address and the entry identifies one or more second processor cores as targets, as depicted by the positive branch from decision block 218, flow continues to block 208 and a stash message is sent to each of the target processor cores. The stash message notifies the target processor core that newly written data associated with the first data address is available. Again, the target processor core may ignore the stash message or pre-fetch the data associated with the first data address into a cache of the second processor core. This may be a local or private cache of the second processor core, for example, or a lower level cache of a cluster of cores. In the event that the second processor core executes an instruction to read the data before it is evicted from the cache, a cache hit will occur and the time to read the data is reduced. A cache hit improves the performance of the data processing system by reducing the time to execute a read operation for the data. If no entry is found in the Stash Target Table for the data address, or if a found entry does not identify any targets, as depicted by the negative branch from decision block 218, execution of the stash instruction is complete, as indicated by block 214. However, as will be described in detail below, the Stash Target Table may be updated.

Figure 3:
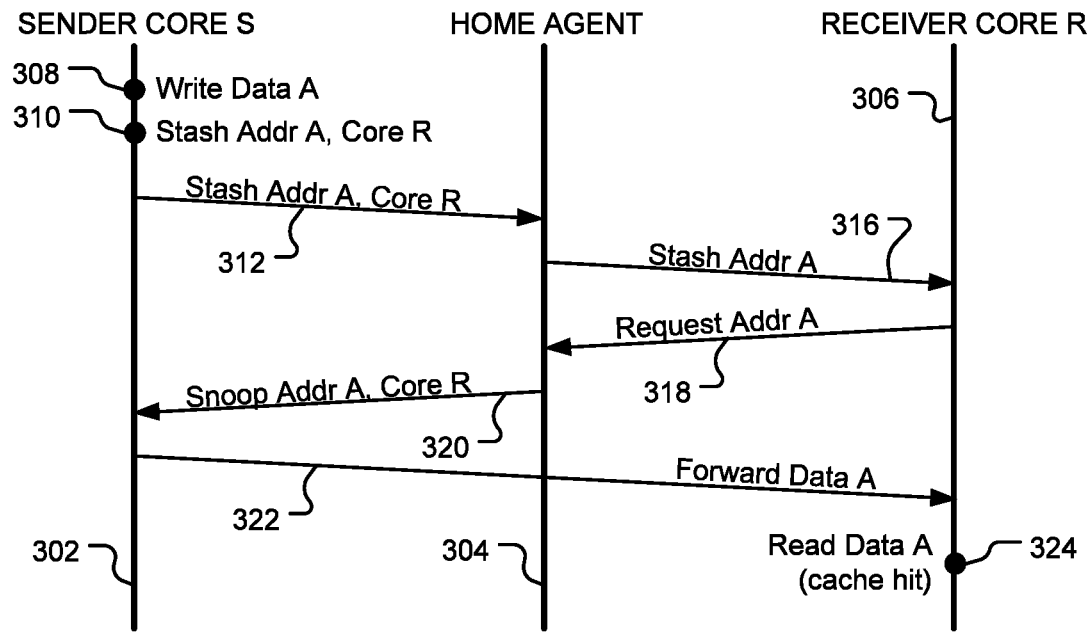
FIG. 3 is an interaction chart for an example core-to-core stash operation, in accordance with various representative embodiments.

FIG. 3 is an interaction chart 300 for an example core-to-core stash operation, in accordance with various representative embodiments. The chart shows timeline 302 for a sender or producer core S, timeline 304 for a home agent and timeline 306 for a receiver or consumer core R, with time flowing downwards. At 308, the sender core writes data associated with a data address A to a cache line of the sender core. At 310, the sender core executes a stash instruction for data address A, indicating core R as the stash target. The stash instruction may take the form:

STASH data_address, target_id where the operand data_address may be a virtual address, an indicator of a range of virtual addresses, or some other indicator of one or more data addresses. The operand target_id identifies one or more processor cores as cache targets. It may be, for example, a numerical identifier or a bit-vector. In a bit-vector, a bit position corresponds to a stash target.

Message 312 is sent to the home agent. In response, the home agent sends stash message 316 to the target core R. Stash message 316 indicates that the data associated with data address A has been modified. Core R may choose to ignore the message or to pre-fetch the data associated with data address A. When core R chooses to pre-fetch the data associated with data address A, it sends read request 318 for the data to the home agent. The home agent, in response, sends message 320 to the sender core requesting the data associated with data address A be sent to core R. Messages from the home agent to a processor core may be referred to as 'snoop' messages. The sender core completes the stash operation by forwarding the data associated with data address A to the receiver core, core R in message 322. The forwarded data is stored in the local cache of core R. When receiver core R executes a read operation at 324, the data is already in the local cache, so the read results in a cache hit and the data can be loaded with minimum latency. In this manner, performance of the data processing system in improved.

In a further embodiment, a stash message may be sent directly from the sender core to the receiver core when the stash instruction identifies the stash target. In this case, after forwarding the data to core R, an acknowledgment may need to be sent from the sender core to the home agent to enable the home agent to monitor data coherency.

Figure 4:
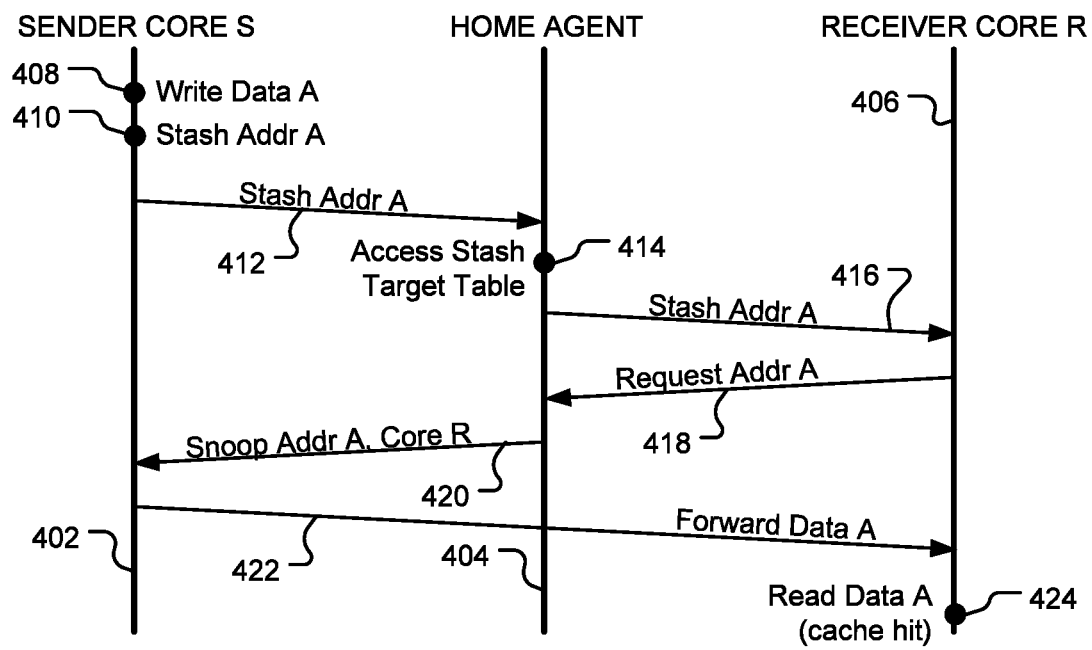
FIG. 4 is an interaction chart for a further example of a core-to-core stash operation, in accordance with various representative embodiments.

FIG. 4 is an interaction chart 400 for a further example of a core-to-core stash operation, in accordance with various representative embodiments. The chart shows timeline 402 for a sender or producer core S, timeline 404 for a home agent and timeline 406 for a receiver or consumer core R, with time flowing downwards. At 408, the sender core writes data associated with a data address A to a cache line of the sender core. At 410, the sender core executes a stash instruction for data address A with no indication of a stash target. The stash instruction may take the form:

STASH data_address where the operand data_address may be virtual address, for example.

In FIG. 3, the home agent determined the stash target directly from message 312. However, in FIG. 4 message 412 contains data address A but no target identifier. In this embodiment the home agent determines the stash target (or targets) by accessing a Stash Target Table, at 414, based on data address A indicated in stash message 412. If the table includes an entry for data address A and that entry identifies one or more stash targets, stash message 416 is sent to the identified receiver core for the data address A. The method continues as described with reference to FIG. 3, with interactions 418-424 corresponding to elements 318-324. When core R chooses to pre-fetch the data associated with data address A, it sends read request 418 for the data to the home agent. The home agent, in response, sends message 420 to the sender core requesting the data associated with data address A be sent to core R. The sender core completes the stash operation by forwarding the data associated with data address A to the receiver core, core R in message 422. The forwarded data is stored in the local cache of core R. When the receiver core, core R, executes a read operation at 424, the data is already in the local cache, so the read results in a cache hit and the data can be loaded with minimum latency.

In the approach described with reference to FIG. 3, an identifier in the stash message is used to determine the stash targets, while in the approach described with reference to FIG. 4, a Stash Target Table is used to determine stash targets. Several example mechanisms for generation and maintenance of the Stash Target Table are described below with reference to FIGS. 7-11. In general, the home agent generates and maintains the stash target by monitoring data transfers and data coherency operations for data addresses.

Thus, FIGS. 3 and 4 illustrate examples of a method of data transfer in a data processing system. In accordance with the method, a first processor core writes data associated with a first data address to a first cache, and sends a first stash request to a home agent of the data processing system, the first stash request including the first data address. The home agent or producer core, determines, based at least in part on the first stash request, a second processor core to receive a stash message and sends the stash message to the second processor core. On receiving the stash message, the second processor core may opt to pre-fetch the data associated with the first data address into a cache of the second processor core. In one embodiment, the first stash request includes an identifier of the second processor core. In a further embodiment, the stash target is determined by accessing a first entry in a stash target table, the first entry associated with the first data address.

FIG. 5 shows an example of a Stash Target Table (STT) 500, in accordance with various representative embodiments. Each entry in table 500 includes a data address 502 and an identifier 504 of one or more stash targets. Initially, an entry may have a data address but no stash target. The data address 502 may be a physical address or an intermediate address, such as an apparent or ghost physical address. The data address may be an identifier of a cache line or page, for example. More generally, the memory may be logically split in regions at a designated granularity (smaller than, larger than or equal to a cache line), in which case the data address may be an identifier of a region. A data processing system may include multiple SSTs using different granularities.

FIG. 6 shows a further example of a Stash Target Table (STT) 600, in accordance with various representative embodiments. Each entry in the table comprises a base data address 602, identifiers 604 of one or more stash targets and a size 606. The base address and size, together, indicate a range of size addresses (e.g. size cache lines, size words or size bytes) from base_address to base_addess+size−1. Thus, the first entry in STT 600 indicates stash targets for addresses A, A+1, A+2 and A+3 and is equivalent to the first four entries in table 500 of FIG. 5. In this example, the stash targets are identified as a bit-vector. For example, identifier in the second entry in table 600 is the bit-vector 00001010, where the positions of the 1's indicate stash targets 2 and 4 for data address B.

The range of entries specified by base data address 602 and size 606 may be restricted to not cross designated memory boundaries. This enables implementation as a set associative table, where only one set would need to be searched for each table lookup operation.

An STT may be located at the home agent or at each of a number of processor cores. Alternatively stash target information may be stored in the snoop filter cache of the home agent. For each cache line, the snoop filter cache may include an entry with data fields recording the sharers, owner and coherency status for a number of cache lines. An additional field may be provided to record the stash targets for the cache line. This is efficient for applications where a majority of cache lines have cache targets, but is less efficient for applications where only a small percentage of cache lines have stash targets.

In the sequel, various example methods for creating and updating an STT are disclosed. These examples are described with reference to a home agent. However, equivalent methods may be also be used for maintaining an STT at a processor core.

Figure 7:
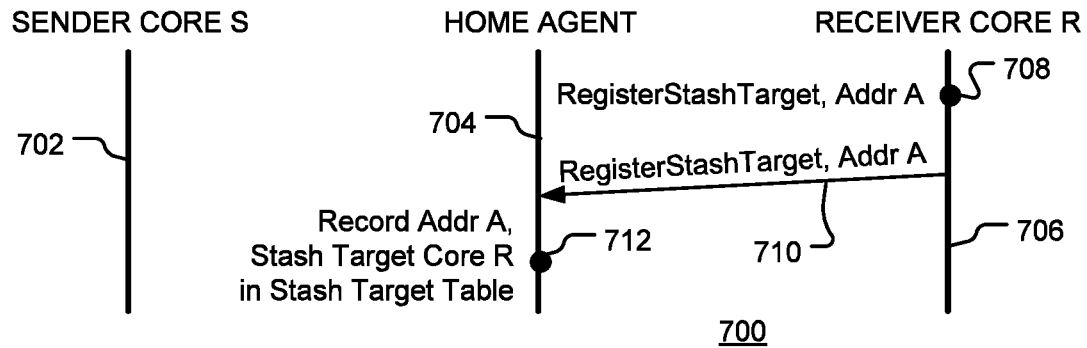
FIGS. 7-11 are interaction charts illustrating methods for updating a Stash Target Table, in accordance with various representative embodiments.

FIG. 7 is an interaction chart 700 for a method of updating a Stash Target Table, in accordance with various representative embodiments. In accordance with the method a receiver processor core sends a target registration message for a data address to the home agent. In response, the home agent generates an entry in the stash target table, the first entry identifying the receiver processor core as a target for data associated with the data address. Referring to FIG. 7, the chart shows timeline 702 for a sender or producer core S, timeline 704 for a home agent and timeline 706 for a receiver or consumer core R, with time flowing downwards. At 708 the receiver core R executes a register instruction indicating to the hardware that the software running on the receiver core (future target) expects to read data that will be stashed by another core. The data may be specified by a virtual address. For example, the register instruction may take the form:

STASH_TARGET virtual_address

The core executing this instruction is identified as the target of future stashes for the cache line containing the physical address corresponding to this virtual address.

Alternatively, the STASH_TARGET instruction may specify a virtual address range, taking the form, for example, STASH_TARGET base_virtual_address, size This instruction identifies all cache lines associated with the corresponding physical addresses as potential targets of stashing operations targeting the core executing the STASH_TARGET instruction.

Execution of the register instruction causes message 710 to be sent from the receiver core R to the home agent. It is noted that the virtual address may be translated to an intermediate or physical address for inclusion in message 710.

In some applications, threads are pinned to cores. In other applications, a STASH_TARGET instruction may need to be executed or re-executed after a consumer thread is migrated, so as to ensure that the reported target core is correct when the actual stash operations are executed. When initializing, reading or recycling a data buffer, various opportunities exist for executing STASH_TARGET instructions, so there may be no need to proactively execute STASH_TARGET instructions immediately following each thread migration. It is common for threads to be executed by a core for longer than the program iterations amenable to stashing. As a result, a lack of proactive registration may only result in a small proportion of stashing opportunities being missed.

At 712, the home agent creates, or updates, an entry in the Stash Target Table for the data address A indicating receiver core R as a stash target.

Again, since the snoop filter in the home agent records meta-data associated with each cache line (including the coherency state of the cache line in the various caches, which cores have copies of the cache line and, which core, if any owns the cache line), the meta-data may be augmented to include a stash target field (such as a bit-vector) that stores the stash targets for the cache line.

In an alternative embodiment, a Stash Target Table as described above may be used to record the reported target core information. This Stash Target Table need only record data for cache lines to be stashed, which may be a small fraction of the total number of cache lines stored in the snoop filter cache. The Stash Target Table may be a set-associative cache, indexed, and fully or partially tagged, with the cache line physical address and storing the stash target or targets in each entry. A recency-based cache replacement policy may be used, so that least recently used entries in the table are eventually replaced, including those stale due to thread migrations, etc. The only potential impact of an incorrect stash target due to a stale entry is the occurrence of the same cache miss that would have happened without stashing. The target will be corrected when the consumer thread re-executes a new STASH_TARGET instruction for the line.

As discussed above, the Stash Target Table may specify an address range. This decreases the number of entries required, for example, when stashing large messages or when a communication library operates with large buffers. When address ranges are specified, address range overlap between entries may be detected and older entries updated and/or invalidated to prevent overlap.

Figure 8:
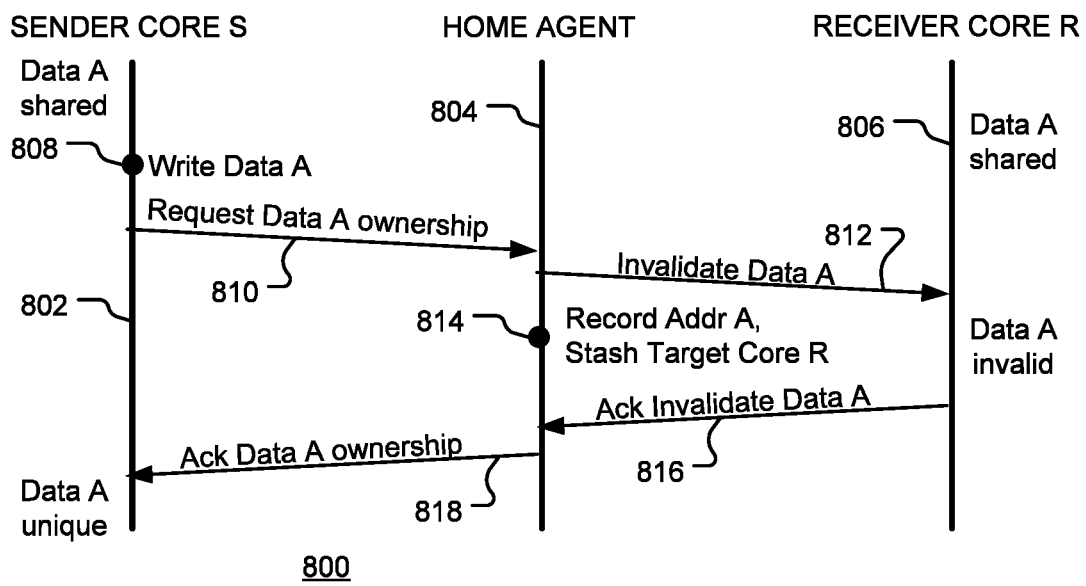

FIG. 8 is an interaction chart 800 for a further example update of a Stash Target Table, in accordance with various representative embodiments. The chart shows timeline 802 for a sender or producer core S, timeline 804 for a home agent and timeline 806 for a receiver or consumer core R, with time flowing downwards. In this embodiment, the home agent updates the Stash Target Table when a change in coherency state of the data occurs.

A core that is about to write to a cache line (sender) must request the line in Unique state, invalidating all copies of the line in other cores' private caches. This establishes the core as having ownership of the cache lines. Cores that get invalidation messages (Sharers of the line) are previous readers or writers of the line, and therefore, potential stashing targets for the newly produced cache line when the sender executes a stash operation for the line. Usually the time between writing a buffer cache line and stashing it is short (often less than several thousand cycles), which creates an opportunity to identify the core with recently invalidated copies of a cache line as targets of the subsequent stashing operation.

Referring again to FIG. 8, at 808 the sender core S initiates a write operation for data associated with data address A. In this instance, the cache line is shared with other cores, so message 810 is sent to the home agent requesting ownership of the appropriate cache line for core S. In response, the home agent accesses its snoop filter and identifies receiver core R as a sharer of the cache line. Home agent then sends invalidation message 812 to the receiver core R to invalidate the cache line in the cache of the receiver core.

From this transaction, it is apparent that the sender core is a producer of data associated with data address A, while receiver core has, at least previously, been a consumer (or producer) of the data. Based on this knowledge, the home agent generates, or updates, an entry in the Stash Target Table, at 814, indicating that receiver core R is a potential stash target for data associated with data address A. The operation is completed by receiver core R acknowledging, in message 816, the invalidate message to the home agent and the home agent forwarding the acknowledgment, in message 818, to the sender core S. The data in the local cache of sender core S is now in a Unique coherency state and sender core S has ownership of the cache line.

This approach enables the Stash Target Table to be updated by the home agent without a core needing to know the identities of stash targets or stash sources. This is useful, for example, where it is difficult for software to access to the stash target IDs, such as in virtualized environments and when there are multiple library layers, such as networking stacks.

This mechanism is effective, for example, for use with communication libraries that reuse a buffer for communication between the same two cores. In this case, the snoop filter will repeatedly see the same Shared-to-Unique transition for a given address (cache line).

In the case that there are more than two sharers when the make unique request is received at the home agent, it may insert multiple targets in the Stash Target Table.

Figure 9:
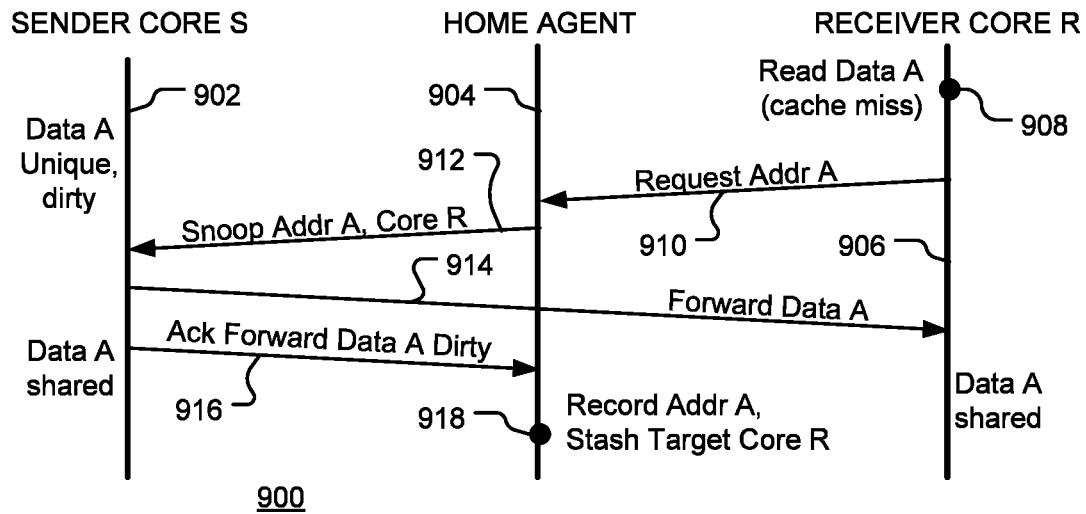

Another opportunity, illustrated in FIG. 9, to predict stash targets exists when a dirty cache line (i.e. a cache line containing data that has been written but not yet stored back to memory) is requested by and forwarded to another core. The requesting core is the potential stash target of a stashing operation. The home agent may insert the stash target in the Stash Target Table when it receives a forwarding acknowledgement from the sender in accordance with the cache coherence protocol.

FIG. 9 is an interaction chart 900 for a further method of updating a Stash Target Table, in accordance with various representative embodiments. The chart shows timeline 902 for a sender or producer core S, timeline 904 for a home agent and timeline 906 for a receiver or consumer core R, with time flowing downwards. In this embodiment, the home agent again updates the Stash Target Table when a change in coherency state of the data occurs. However, in this case, the table is updated when a cache transitions from a Unique-Dirty state to a Shared-Dirty state.

Referring to FIG. 9, receiver core R requests data associated with data address A at 908 by sending request 910 to the home agent. The home agent accesses its snoop filter, identifies sender core S as the owner of the cache line and sends snoop request 912 to the sender core S. In response, sender core S forwards the cache line to receiver core R in message 914 and acknowledges the transaction to the home agent in message 916. From this transaction and knowledge that the data is 'dirty' (i.e. modified), it is apparent that sender core S is a producer of data associated with data address A and that receiver core R is consumer of the data. Accordingly, at 918, the home agent creates an entry in the Stash Target Table for data address A identifying receiver core R as a stash target.

The approach in FIG. 9 is effective provided that the updated stash target table entry has not been evicted from the Stash Target Table by the time a sender writes to the cache line and executes the stash instruction. However, it is recognized that not all forwarded cache lines will be actual targets of future stashing operations.

Figure 10:
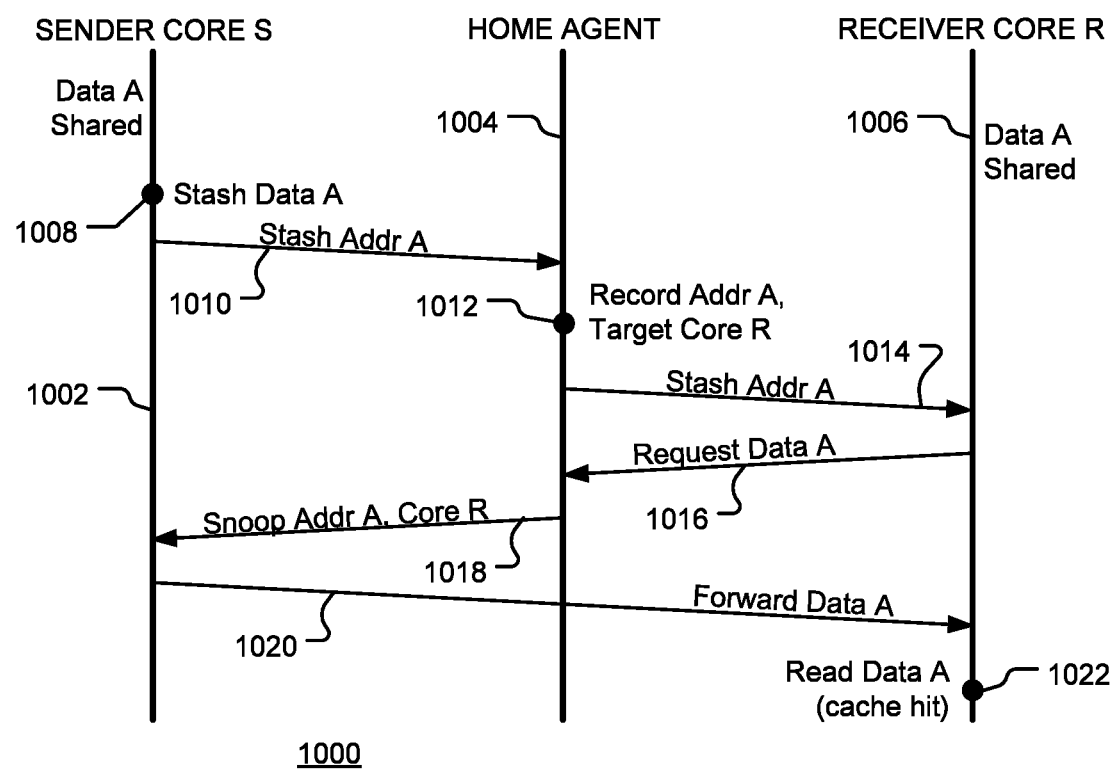

FIG. 10 is an interaction chart 1000 for a further example update of a Stash Target Table, in accordance with various representative embodiments. The chart shows timeline 1002 for a sender or producer core S, timeline 1004 for a home agent and timeline 1006 for a receiver or consumer core R, with time flowing downwards. When a stash instruction without a stash target is executed at 1008, a corresponding message 1010 is sent to the home agent. The Stash Target Table is accessed at 1012 and receiver core R is determined to be the stash target. Stash message 1014 is sent to the stash target. In this example, receiver core R opts to decline the stash message and sends message 1016 acknowledging receipt of the stash message and declining the data associated with data address A. The home agent updates the Stash Target Table at 1018 to remove receiver core R as a stash target for data address A.

Figure 11:
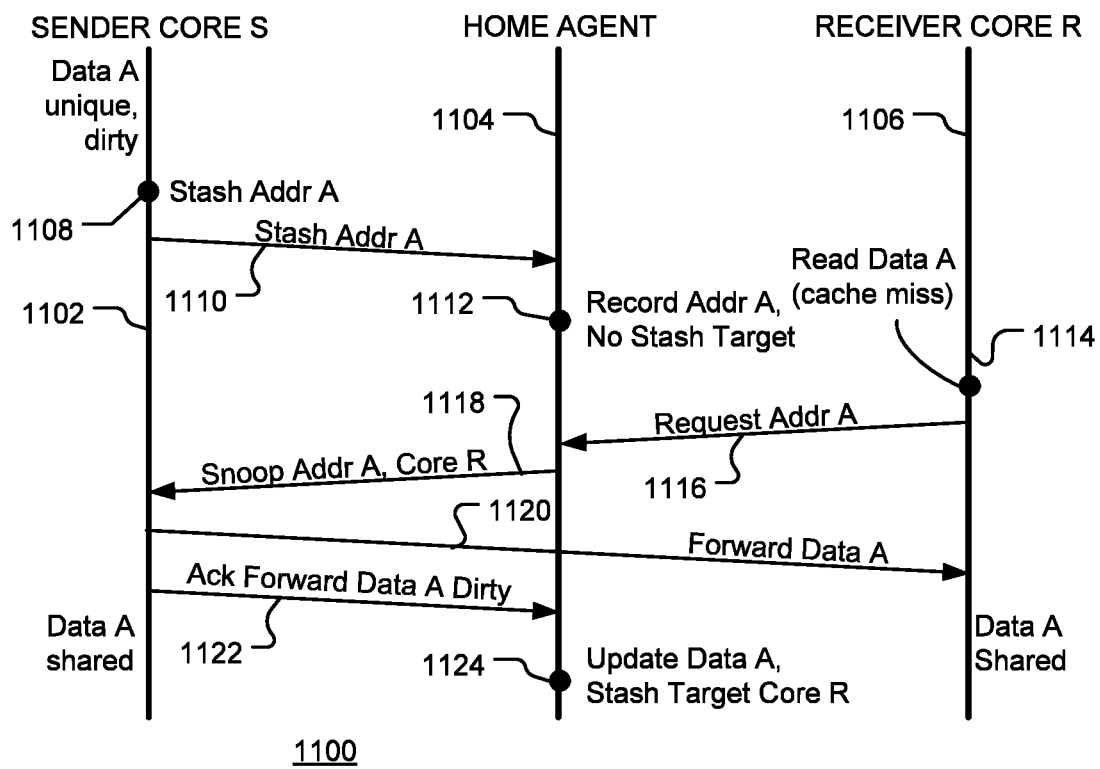

FIG. 11 is an interaction chart 1100 for a further method for updating a Stash Target Table, in accordance with various representative embodiments. In the approach shown, an entry is only inserted into the Stash Target Table for those cache lines that have been specified in a stash instruction. The chart shows timeline 1102 for a sender or producer core S, timeline 1104 for a home agent and timeline 1106 for a receiver or consumer core R, with time flowing downwards. When a stash instruction without a stash target is executed at 1108, a corresponding message 1110 is sent to the home agent. In the example shown in FIG. 11, the cache line is in a unique, dirty state. That is, only the sender core has a valid copy of the data, but the data is dirty since it has not yet been written back to memory. In response to the stash message, the home agent generates an entry in the Stash Target Table for data address A at 1112 (assuming such an entry does not already exist). However, any new entry created at 1112 does not identify any stash targets.

At a later time, at 1114, receiver core R initiates a read operation. Since the data is not in the local cache of core R, a request 1116 is sent to the home agent for the data. The home agent sends snoop message 1118 to sender core S and sender core S forwards the requested data to the receiver core R in message 1120. Sender core S then acknowledges the transaction to the home agent in message 1122. At 1124, the home agent updates the entry for data address A to indicate receiver core R as a stash target for data address A.

It will be apparent to those of ordinary skill in the art that other events could be used to identify targets for a Stash Target Table. Events include, for example, the eviction of the data from a receiver's private cache, a transition from Shared-to-Unique, and the forwarding of a dirty cache line. Targets will then be available for a future stash instruction.

The stash targets in the Stash Target Table may be reset on the execution of a designated number of stash instructions, to enable the system to relearn the stashing targets for the next iteration. Alternatively, this could be done with feedback from the receiver on whether the stash was useful.

Since capacity of the Stash Target Table is limited, it may follow a recency-based replacement policy (such as Least Recently Used) for entries. The software may consider the Stash Target Table capacity in deciding how many lines can be reasonably stashed without specifying a stash target.

Figure 12:
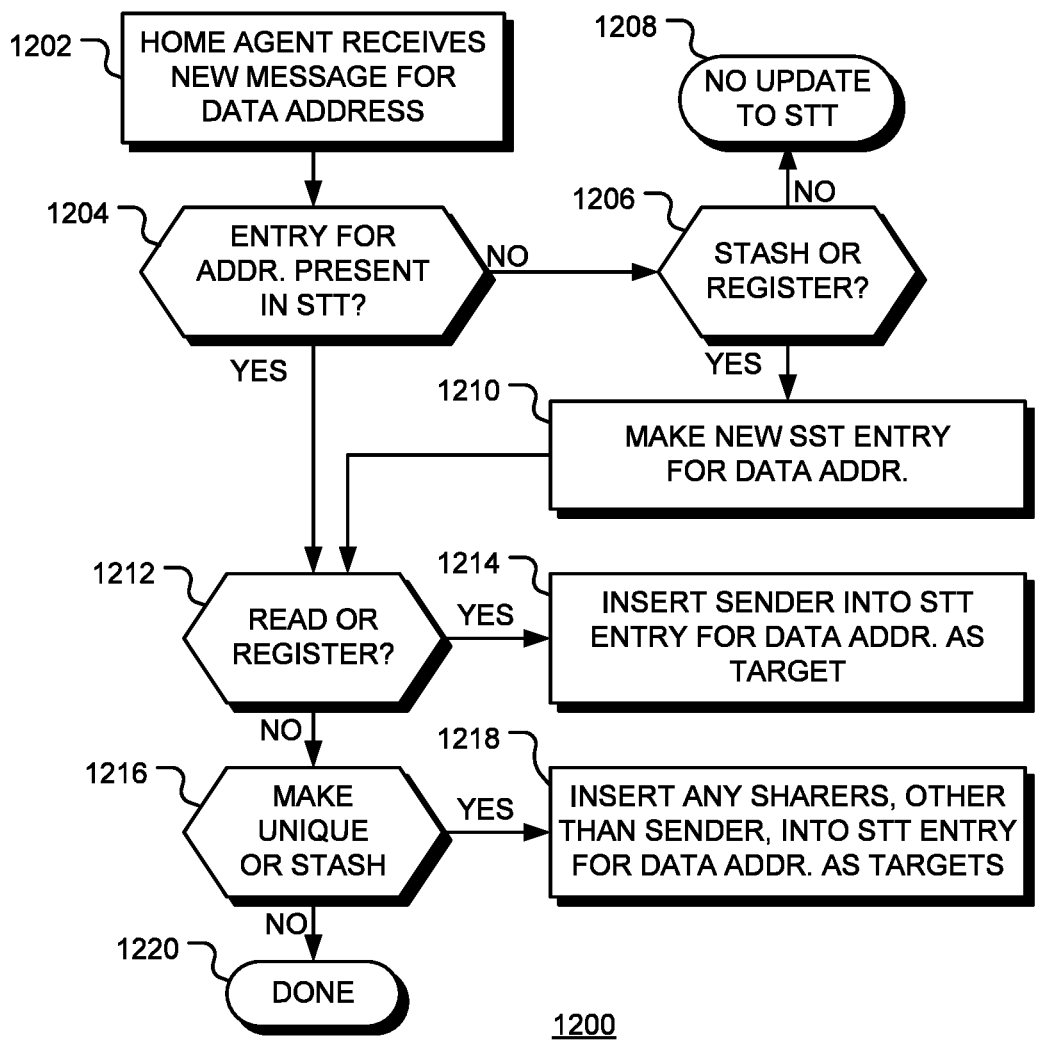
FIG. 12 is a flow chart of a method for creating and updating a Stash Target Table by a home agent, in accordance with various representative embodiments.

FIG. 12 is a flow chart 1200 of a method for creating and updating a Stash Target Table by a home agent, in accordance with various representative embodiments. At block 1202, a home agent receives a message from a processor core, the message specifying a data address. If the home agent determines that there is currently no entry associated with the data address in the Stash Target Table, as depicted by the negative branch from decision block 1204, flow continues to decision block 1206. If the message received from the processor core is neither a stash message nor a register-target message, as depicted by the negative branch from decision block 1206, no update is made to the Stash Target Table, as indicated by block 1208. If the message from the processor core is a stash message or a target registration message, as depicted by the positive branch from decision block 1206, a new entry for the data address is made in the Stash Target Table at block 1210 and flow continues to decision block 1212. Flow also continues to decision block 1212 when the entry for the data address already exists in the table, as depicted by the positive branch from decision block 1204.

If the received message is a request to read modified or dirty data from a producer core, or an explicit request to register a core as a stash target, as depicted by the positive branch from decision block 1212, an identifier of the core that sent the message to the home agent is inserted in the Stash Target Table, at block 1214, into the entry for the specified data address.

If the received message is a request from a producer core for ownership of a cache line (i.e. a request make the cache line unique), or a stash request from a producer core, as depicted by the positive branch from decision block 1216, the home agent determines from the snoop filter which, if any, other cores share the cache line and, at block 1218, inserts identifiers of those cores into the Stash Target Table entry for the data address. If the message is some other message, as depicted by the negative branch from decision block 1216, the updated to the Stash Target Table is complete for the received message, as indicated by block 1220.

In this manner, the Stash Target Table may be created and updated by the home agent responsive to messages received from the processor cores. When a sender core knows the target for a stash operation, the target's identifier may be included in the stash message. When the receiver of a stash operation knows the source of the updated data, the receiver can register with the home agent. In other cases, the home agent determines the stash targets based on interactions between the processor cores.

In one embodiment, the home agent generates an entry in the Stash Target Table for a data address responsive to receiving a stash request for the data address from a first processor core. When data associated with the data address is stored in caches of one or more second processor cores, the data in the caches is invalidated responsive to a request by the first processor core to make the data unique in a cache of the first processor core. The home agent updates the entry to identify the one or more second processor cores as targets for future stash requests for the data address.

The entry may also be created or updated when a read request for the data associated with the data address is forwarded, by the home agent, from the second processor core to the first processor core. The updated entry identifies the second processor core as a target for a stash request for the data address.

More generally an entry in the Stash Target Table for a first data address, by the home agent, responsive to a change in a coherency state of the data associated with the first data address from unique to shared or shared to unique in a cache of the first processor core.

For example, the home agent may generate an entry in the Stash Target Table for a data address in response to a stash message from a first processor core and, at a later time, update the entry responsive to forwarding the data associated with the data address to a second processor core, to identify the second processor core as a stash target for the data address.

Figure 13:
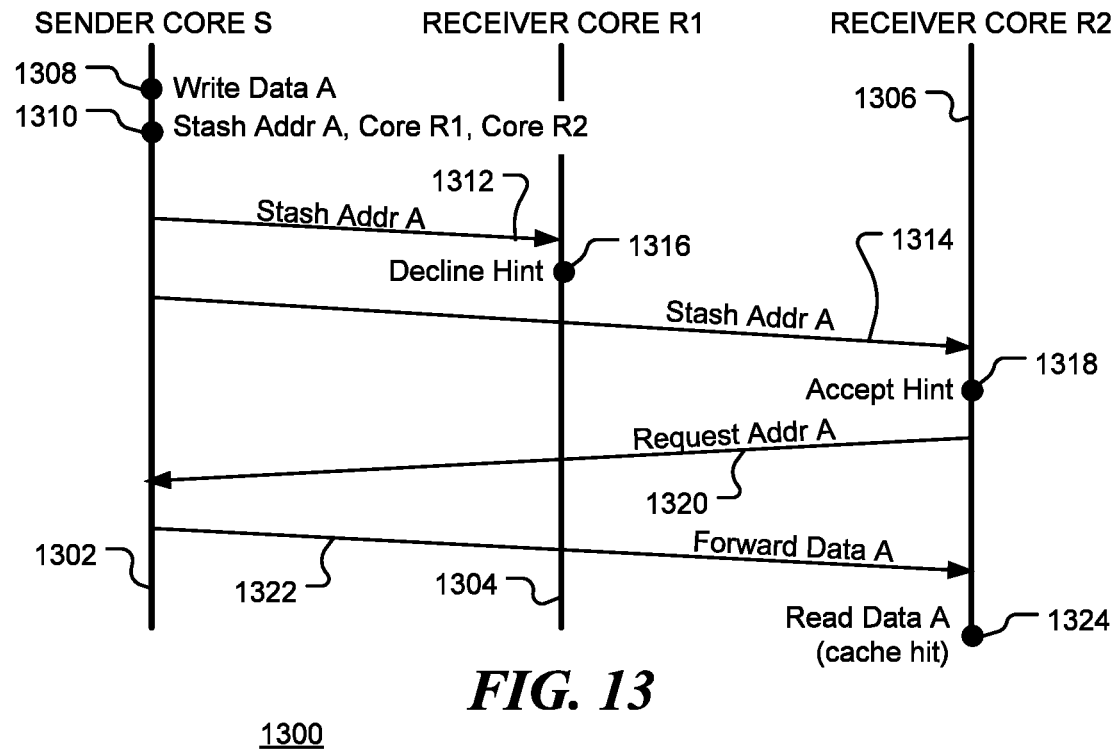
FIGS. 13 and 14 are interaction charts for example core-to-core stash operations, in accordance with various representative embodiments.

FIG. 13 is an interaction chart 1300 for a core-to-core stash operation, in accordance with various representative embodiments. The chart shows timeline 1302 for a sender or producer core S, timeline 1304 for a first receiver core R1 and timeline 1306 for a second receiver core R2, with time flowing downwards. At 1308, the sender core writes data associated with a data address A to a cache line of the sender core. At 1310, the sender core executes a stash instruction for data address A, indicating cores R1 and R2 as the stash target. Sender core S sends stash message 1312 to receiver core R1 and stash message 1314 to receiver core R2. Alternatively, the stash message may be broadcast to all other receiver cores. The stash message provides a notification or hint to the receiver cores that the data associated with address A is available at sender core S. In the example shown, receiver core R1 opts, at 1316, to decline the data, while receiver core R2, at 1318, opts to accept the data. Receiver core R2 requests the data in message 1320 and the data is returned from sender core S in forward message 1322. Subsequently, at 1324, receiver core R2 executes a read instruction for data associated with address A. The instruction results in a cache hit since the data has already been stashed in a local cache of receiver core R2. In this embodiment, a home agent is not required. Each core may monitor data transactions to track data coherency. In addition, each core may maintain a Stash Target Table.

Figure 14:
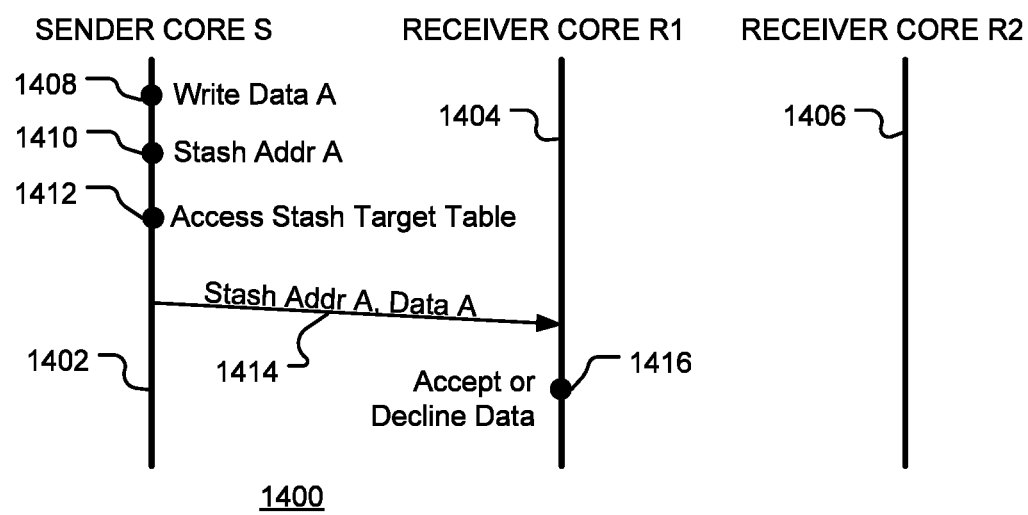

FIG. 14 is an interaction chart 1400 for a further core-to-core stash operation, in accordance with various representative embodiments. The chart shows timeline 1402 for a sender or producer core S, timeline 1404 for a first receiver core R1 and timeline 1406 for a second receiver core R2, with time flowing downwards. At 1408, the sender core writes data associated with a data address A to a cache line of the sender core. At 1410, the sender core executes a stash instruction for data address A with no identification of a stash target. At 1412, the sender core accesses a Stash Target Table. If an entry exists in the Stash Target Table for data address A, a stash message is sent to each of the stash targets identified in the entry. In the example shown, the entry identifies receiver core R1 as the sole target and stash message 1414 is sent to receiver core R1. In this embodiment, the stash message includes the data written at 1408. At 1416, receiver core R1 may opt to accept the data, and store it in a local cache, or decline the data. Alternatively, receiver core R1 may opt to decline the data, in which case a response, such as an acknowledgment may be specified by the protocol.

It will be apparent to those of ordinary skill in the art that stash messages in FIG. 13 may alternatively contain data rather than notifications, and that stash messages in FIG. 14 may alternatively contain a notification rather than data.

Figure 15:
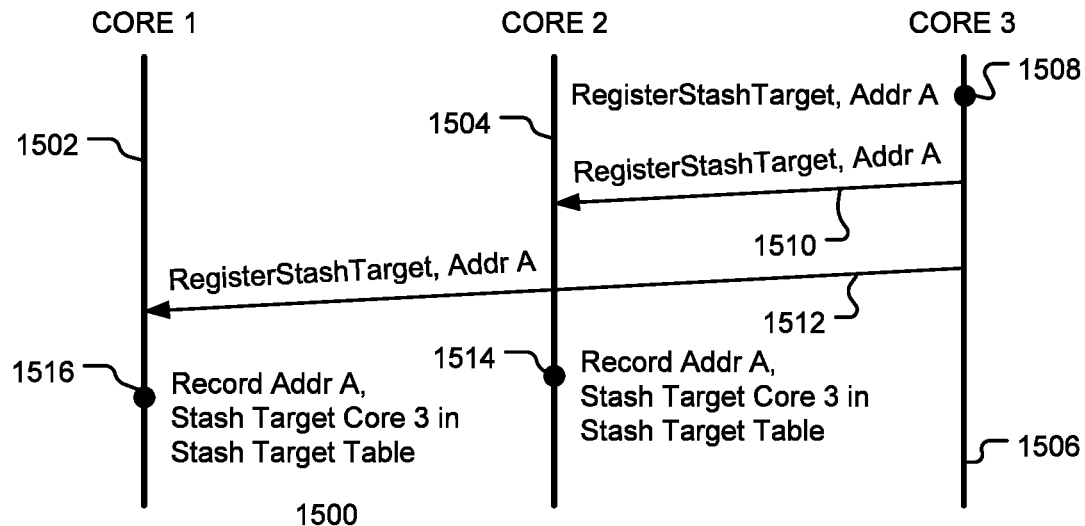
FIG. 15 is an interaction chart for an example stash target registration operation, in accordance with various representative embodiments.

FIG. 15 is an interaction chart 1500 for an example stash target registration operation, in accordance with various representative embodiments. The chart shows timelines 1502, 1504 and 1506 for first, second and third processor cores, with time flowing downwards. At 1508, core 3 executes a registration instruction to register with the other cores as a stash target for data address A. Registration messages are then broadcast to other cores in the processing system. In this example, registration message 1510 is sent to core 2 and registration message 1512 is sent to core 1. On receiving the messages, the cores record the data address in their respective Stash Target Tables—core 2 at 1514 and core 1 at 1516. The table entries for address A then identify core 3 as a stash target. In this way, stash tables may be created at each core. In a similar manner, data transactions between the cores may be monitored and used to predict which cores would benefit from receiving data or a stash notification.

As described above, a stash message may contain data or a stash notification. An example is shown in FIG. 16.

Figure 16:
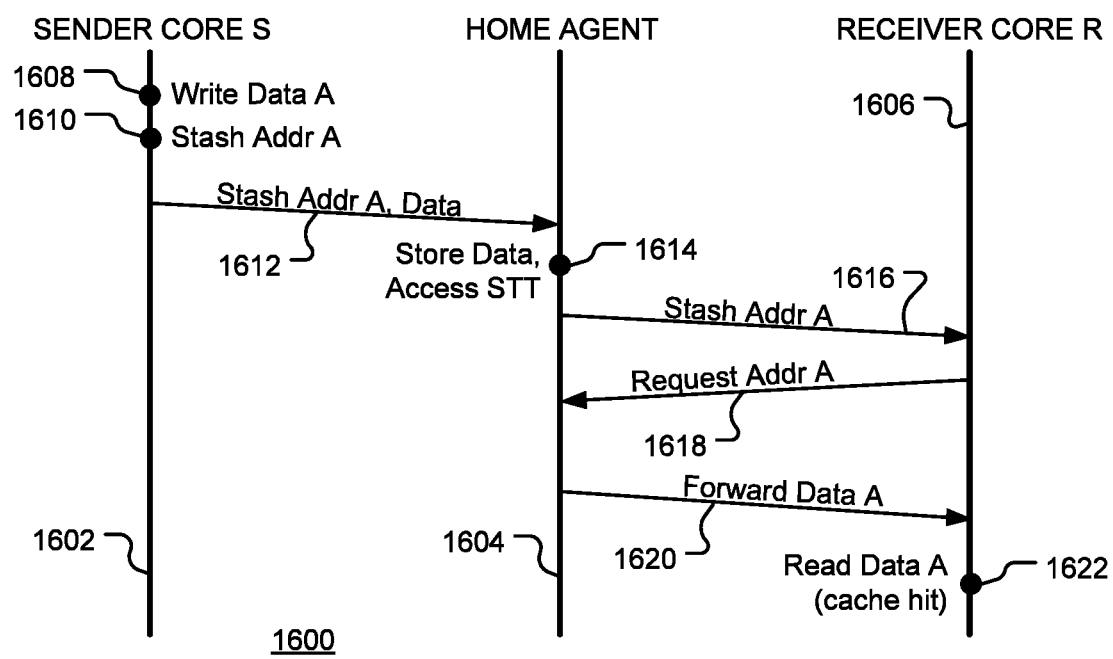
FIG. 16 is an interaction chart for an example core-to-core stash operation, in accordance with various representative embodiments.

FIG. 16 is an interaction chart 1600 for a further example of a core-to-core stash operation, in accordance with various representative embodiments. The chart shows timeline 1602 for a sender or producer core S, timeline 1604 for a home agent and timeline 1606 for a receiver or consumer core R, with time flowing downwards. At 1608, the sender core writes data associated with a data address A to a cache line of the sender core. At 1610, the sender core executes a stash instruction for data address A with no indication of a stash target. The stash instruction may take the form: STASH data address where the operand data_address may be virtual address or some other indicator of a cache line (such as an address tag), or the stash instruction may identify one or more stash targets.

In the example shown in FIG. 16, message 1612 contains data address A, and the data associated with data address A, but no target identifier. Accordingly, at 1614, the data is stored in a system cache of the home agent. Also at 1614, the home agent determines the stash target (or targets) by a accessing a Stash Target Table based on the data address A identified in stash message 1612. If the table includes an entry for data address A and that entry identifies one or more stash targets, stash message 1616 is sent to the identified receiver core for the data address A. When core R opts to pre-fetch the data associated with data address A, it sends read request 1618 for the data to the home agent. The home agent, in response, sends the request data to receiver core R in message 1620. The data is stored in the local cache of core R. When the receiver core, core R, executes a read operation at 1622, the data is already in the local cache, so the read results in a cache hit and the data can be loaded with minimum latency.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method of data transfer comprising:
writing, by a first processor core of a data processing system, data associated with a first data address to a first cache;
executing, by the first processor core, a stash instruction having, as a first operand, a virtual address corresponding to the first data address;
determining a second processor core of the data processing system to be a stash target for a stash message, including:
when the stash instruction includes a second operand, determining the stash target based on the second operand, and
when the stash instruction does not include the second operand, accessing a first entry associated with the first data address in a Stash Target Table, and determining the stash target based on the first entry;
sending the stash message to the second processor core, the stash message including the first data address; and
responsive to receiving the stash message, the second processor core storing the data associated with the first data address in a cache of the second processor core.

2. The method of claim 1, further comprising the first processor core determining the second processor core to be the stash target and sending the stash message to the second processor core.

3. The method of claim 1, where the second operand of the stash instruction includes an identifier of the second processor core.

4. The method of claim 1, where the stash message includes the data associated with the first data address.

5. The method of claim 1, where the first cache is a cache of the first processor core and the second processor core storing the data associated with the first data address in the cache of the second processor core includes:
the second processor core requesting the data associated with the first data address; and
the first processor core forwarding the data associated with the first data address to the second processor core.

6. The method of claim 1, further comprising, prior to said determining:
sending, by the second processor core, a target registration message for the first data address; and
generating the first entry in the Stash Target Table, the first entry identifying the second processor core as a target for data associated with the first data address.

7. The method of claim 1, further comprising, prior to said determining:
generating the first entry in the Stash Target Table for a first data address responsive to receiving a prior stash request for the first data address from the first processor core.

8. The method of claim 1, further comprising,
updating the first entry in the Stash Target Table responsive to a change in a coherency state of the data associated with the first data address from unique to shared or shared to unique in a cache of the first processor core.

9. The method of claim 1, further comprising, prior to said writing:
invalidating data associated with the first data address stored in caches of one or more third processor cores responsive to a request by the first processor core for ownership of the data associated with the first data address; and
updating the first entry in the stash target Table to identify the one or more third processor cores as stash targets for the first data address.

10. The method of claim 1, further comprising:
sending, by the first processor core, a first stash request to a home agent of the data processing system, the first stash request including the first data address and the home agent configured for said determining the second processor core of the data processing system to be the stash target for the stash message and said sending the stash message to the second processor core.

11. The method of claim 10, where said determining includes accessing a first entry in a Stash Target Table, the first entry associated with the first data address.

12. The method of claim 11, further comprising, prior to said determining:
generating, by the home agent, the first entry in the Stash Target Table for a first data address responsive to receiving a prior stash request for the first data address from the first processor core.

13. The method of claim 12, further comprising, prior to said determining:
   forwarding, by the home agent, a read request for the data associated with the first data address from the second processor core to the first processor core;
   updating or creating, by the home agent, the first entry in the Stash Target Table to identify the second processor core as a stash target for the first data address; and
   forwarding, by the first processor core, the data associated with the first data address to the second processor core for storing in the cache of the second processor core.

14. The method of claim 12, further comprising:
   updating the first entry in the Stash Target Table responsive to a change in a coherency state of the data associated with the first data address from unique to shared or shared to unique in a cache of the first processor core.

15. The method of claim 10, where the second processor core storing the data associated with the first data address in the cache of the second processor core comprises:
   sending, by the second processor core, a request to the home agent;
   the home agent sending a message to the first processor core; and
   the first processor core forwarding the data associated with the first data address to the second processor core.

16. A method of data transfer comprising:
   monitoring transactions from a plurality of processor cores of a data processing system that allocate and deallocate data into caches of the plurality of processor cores;
   predicting, based at least in part on the monitored transactions, one or more processor cores of the plurality of processor cores to be stash target cores for data associated with a first data address;
   executing, by a first processor core of the plurality of processor cores, a first stash instruction for the first data address;
   sending a stash message to the stash target cores, the stash message notifying the stash target cores of the data associated with the first data address and produced by the first processor core; and
   responsive to receiving the stash message, a second processor core of the one or more stash target cores storing the data associated with the first data address in a cache of the second processor core.

17. The method of claim 16, further comprising, prior to executing the first stash instruction:
   executing, by the first processor core, a second stash instruction for the first data address;
   storing, responsive to executing the second stash instruction, an entry in a Stash Target Table for the first data address; and,
   updating the entry in the Stash Target Table to identify the second processor core as a stash target core, responsive to the second processor core becoming, or ceasing to become, a sharer of the data associated with the first data address,
where said predicting one or more processor cores of the plurality of processor cores to be stash target cores for data associated with the first data address includes accessing the entry in the Stash Target Table for the first data address.

18. The method of claim 16, further comprising, prior to executing the first stash instruction:
   executing a register instruction by the second processor core for the first data address; and
   creating or updating an entry in a Stash Target Table responsive to the register instruction, the entry identifying the second processor core as a stash target core for the first data address,
where said predicting one or more processor cores of the plurality of processor cores to be stash target cores for data associated with the first data address includes accessing the entry in the Stash Target Table for the first data address.

19. A data processing system comprising:
   an interconnect fabric;
   a plurality of processor cores interconnected by the interconnect fabric, a first processor core of the plurality of processor cores configured for writing data associated with a first data address to a cache and executing a first stash instruction for the first data address;
   Stash Target Table control circuitry configured to:
   monitor transactions from a plurality of processor cores of a data processing system that allocate and deallocate data into caches of the plurality of processor cores;
   create and update entries in a Stash Target Table;
   predict, responsive to the first stash instruction, one or more processor cores of the plurality of processor cores to be stash target cores for the data associated with the first data address;
   send a stash message to the stash target cores, the stash message configured to notify the stash target cores of the data associated with the first data address and produced by the first processor core; and
   where a second processor core of the one or more stash target cores is configured to store the data associated with the first data address in a cache of the second processor core responsive to receiving the stash message.

20. The data processing system of claim 19, further comprising:
   a home agent, coupled to the plurality of processor cores by the interconnect fabric,
   the home agent configured to provide a point of coherences and serialization for the data processing system,
where the home agent includes the Stash Target Table control circuitry.

21. The data processing system of claim 19, where the first processor core includes the Stash Target Table control circuitry.

22. The data processing system of claim 19, where the Stash Target Table control circuitry is further configured to:
   create an entry in the Stash Target Table responsive to a stash instruction from the first processor core or a register request from the second processor core;
   insert the second processor core as a stash target into the entry responsive to a read request or a stash register request sent from the second processor core; and
   insert sharers of the data, other than the first processor core, as stash targets into the entry responsive to a stash instruction from the first processor core or a change of coherency state of the data associated with a first data address from shared to owned by the first processor core.

* * * * *